(12) United States Patent
Lee et al.

(10) Patent No.: US 10,573,919 B2
(45) Date of Patent: Feb. 25, 2020

(54) SECONDARY BATTERY

(71) Applicant: Samsung SDI Co., Ltd., Yongin-si, Gyeonggi-do (KR)

(72) Inventors: Youngjun Lee, Yongin-si (KR); Youngmin Kim, Yongin-si (KR); Jaemin Lim, Yongin-si (KR); Hyunjun Choi, Yongin-si (KR); Euysun Jung, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 218 days.

(21) Appl. No.: 15/344,258

(22) Filed: Nov. 4, 2016

(65) Prior Publication Data

US 2017/0125836 A1    May 4, 2017

(30) Foreign Application Priority Data

Nov. 4, 2015  (KR) .......................... 10-2015-0154755

(51) Int. Cl.
*H01M 10/04*    (2006.01)
(52) U.S. Cl.
CPC ............................. *H01M 10/0468* (2013.01)
(58) Field of Classification Search
CPC ................................................ H01M 10/0468
See application file for complete search history.

(56) References Cited

U.S. PATENT DOCUMENTS

| 8,263,253 | B2 | 9/2012 | Uh | |
|---|---|---|---|---|
| 2004/0038125 | A1* | 2/2004 | Kim | H01M 2/021 429/162 |
| 2011/0311851 | A1* | 12/2011 | Shinoda | H01M 2/263 429/94 |
| 2012/0190252 | A1* | 7/2012 | Pavlinsky | H01M 10/425 439/775 |
| 2013/0108908 | A1* | 5/2013 | Omura | H01M 2/1077 429/94 |

FOREIGN PATENT DOCUMENTS

| KR | 2004-0058922 A | 7/2004 |
|---|---|---|
| KR | 2006-0106463 A | 10/2006 |
| KR | 2010-0032657 A | 3/2010 |

* cited by examiner

*Primary Examiner* — Christopher P Domone
(74) *Attorney, Agent, or Firm* — Knobbe, Martens, Olson & Bear, LLP (57) ABSTRACT

A secondary battery includes: an electrode assembly; and wings configured to press one of upper and lower ends of the electrode assembly in compressing directions. Thermal shrinkage of the electrode assembly may be prevented when the electrode assembly is repeatedly charged and discharged, and thus an internal short circuit caused by shrinkage of the electrode assembly may be prevented. The shape of the electrode assembly may be maintained by suppressing thermal shrinkage or expansion of the electrode assembly.

16 Claims, 9 Drawing Sheets

SECONDARY BATTERY

RELATED APPLICATIONS

This application claims the benefit of Korean Patent Application No. 10-2015-0154755, filed on Nov. 4, 2015, in the Korean Intellectual Property Office, the disclosure of which is incorporated herein in its entirety by reference.

BACKGROUND

Field

One or more exemplary embodiments relate to a secondary battery.

Description of the Related Art

Unlike primary batteries, secondary batteries are rechargeable. Along with advances in technology related to mobile devices such as cellular phones or laptop computers and the increasing production of mobile devices, the use of secondary batteries as power sources has markedly increased. Recently, much research has been conducted into developing secondary batteries for use in electric vehicles or hybrid vehicles as substitutes for fossil fuels.

SUMMARY OF CERTAIN INVENTIVE ASPECTS

One or more exemplary embodiments include a secondary battery configured to prevent thermal shrinkage caused by charge and discharge operations and an internal short circuit caused by thermal shrinkage.

One or more exemplary embodiments include a secondary battery configured to prevent thermal shrinkage or expansion of an electrode assembly and maintain the shape of the electrode assembly.

Additional aspects will be set forth in part in the description which follows and, in part, will be apparent from the description, or may be learned by practice of the presented embodiments.

According to one or more exemplary embodiments, a secondary battery includes: an electrode assembly; and wings configured to press one of upper and lower ends of the electrode assembly in compressing directions.

The wings may press main surfaces of the electrode assembly.

The wings may be provided as a pair at positions facing front and rear surfaces of the electrode assembly so as to press the front and rear surfaces of the electrode assembly.

One of the upper and lower ends of the electrode assembly may be disposed between the wings provided as a pair and may be pressed by the wings.

The secondary battery may further include an insulation spacer disposed above the electrode assembly, wherein the wings may protrude from the insulation spacer toward the electrode assembly.

The insulation spacer may include tab holes to receive electrode tabs extending upward from the electrode assembly.

The electrode tabs may be electrically connected to electrode leads forming a charge or discharge current path.

The electrode tabs may include first tabs and second tabs, the first and second tabs having different polarities and extending from the electrode assembly in parallel with each other, and the wings may include first wings disposed at an outer side of the first electrode tabs and second wings disposed at an outer side of the second electrode tabs.

The wings may further include third wings disposed between the first and second electrode tabs.

The first to third wings may be respectively provided as pairs at positions facing front and rear surfaces of the electrode assembly, wherein the first wings may press a portion of the electrode assembly located at the outer side of the first electrode tabs, the second wings may press a portion of the electrode assembly located at the outer side of the second electrode tabs, and the third wings may press a portion of the electrode assembly located between the first and second electrode tabs.

The secondary battery may further include a support member disposed under the electrode assembly, wherein the wings may protrude from the support member toward the electrode assembly.

A penetration hole may be formed in a center region of the support member.

The wings may include sloped surfaces facing the electrode assembly.

The sloped surfaces have slopes in directions allowing the wings to easily slide inward on an outer surface of the electrode assembly.

The secondary battery may further include a case accommodating the electrode assembly; and a cap plate closing an opened end of the case.

The secondary battery may further include a flexible case accommodating the electrode assembly.

Another exemplary embodiment may comprise a secondary battery comprising: an electrode assembly having a first an second end, front and a back side and a first and second side; and a plurality of compression members that are positioned on the front and back sides of at least one of the first and second ends of the electrode members so as to compress the at least one end of the electrode member inward from the first and second sides.

This embodiment may further comprising an insulation member that extends over the first end of the electrode assembly and wherein the plurality of compression members extend downward from the insulation member.

In this embodiment the insulation member may comprises tab holes and the plurality of electrode members includes tabs that extend through the tab holes.

In this embodiment, the plurality of compression members may be positioned on both the first and second ends of the electrode assembly.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF CERTAIN INVENTIVE EMBODIMENTS

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed. Expressions such as "at least one of," when preceding a list of elements, modify the entire list of elements and do not modify the individual elements of the list.

Hereinafter, secondary batteries will be described with reference to the accompanying drawings, in which exemplary embodiments are shown.

Figure 1:
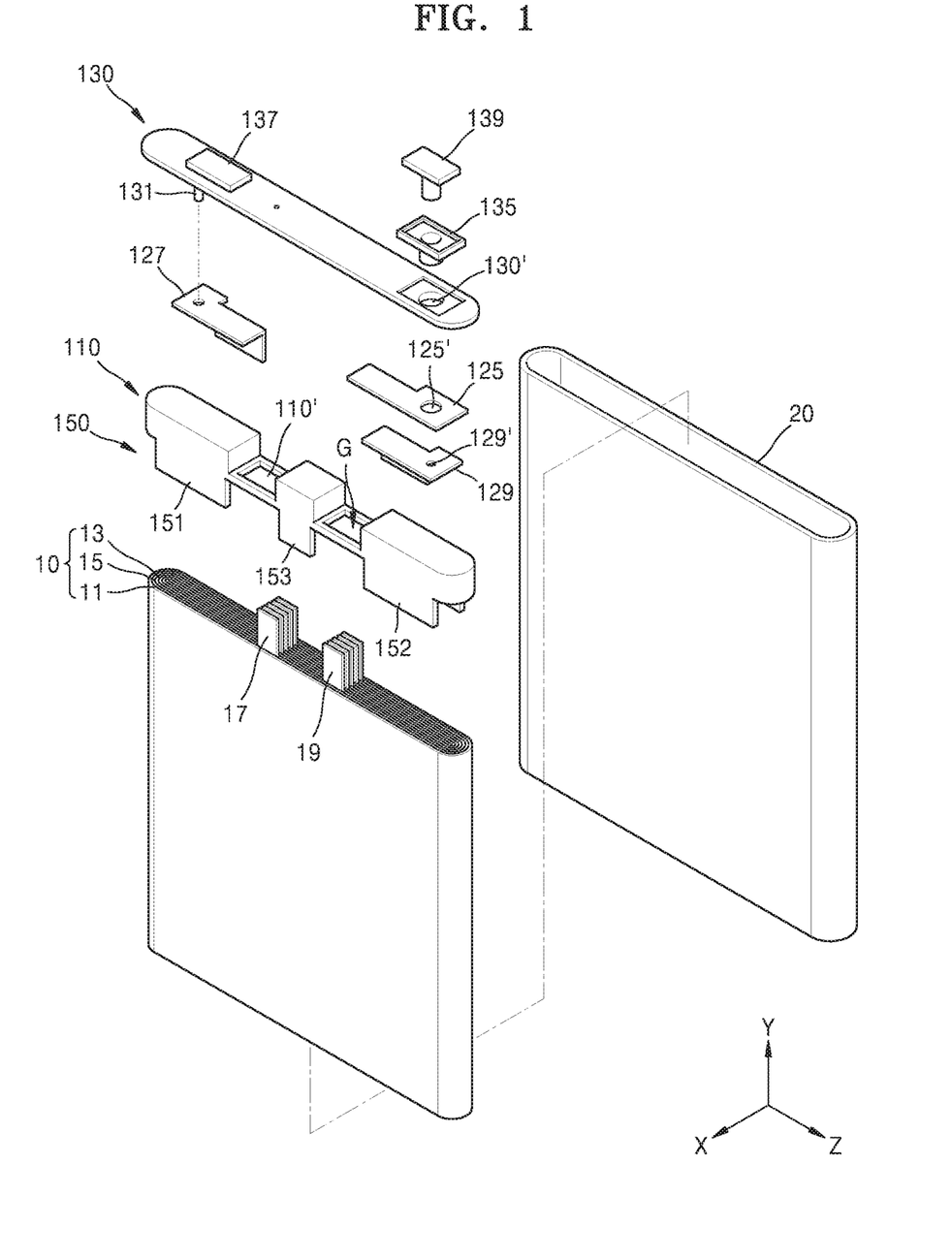
FIG. 1 is an exploded perspective view illustrating a secondary battery according to an exemplary embodiment.
Figure 2:
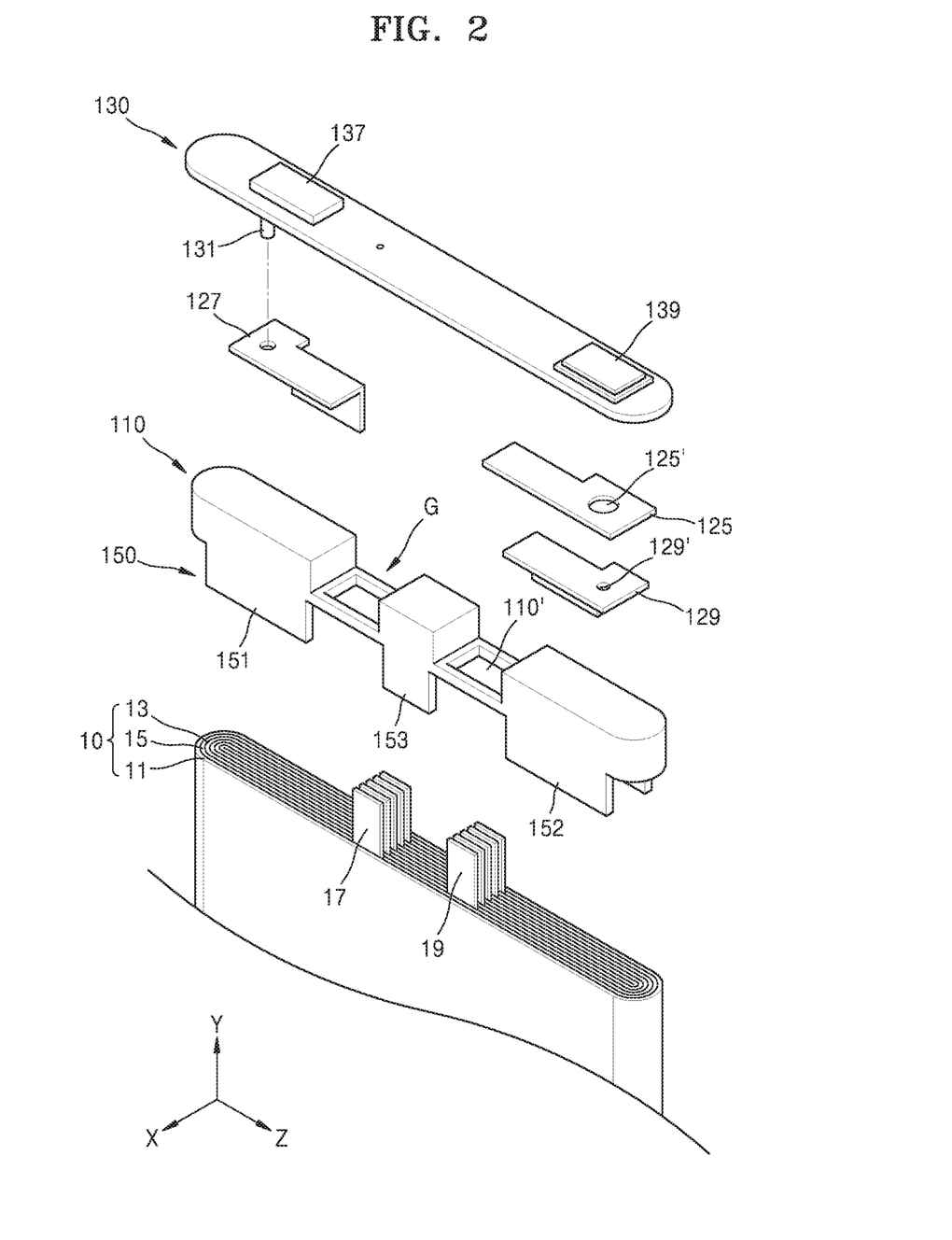
FIG. 2 is an exploded perspective view illustrating some elements of the secondary battery illustrated in FIG. 1.
Figure 3:
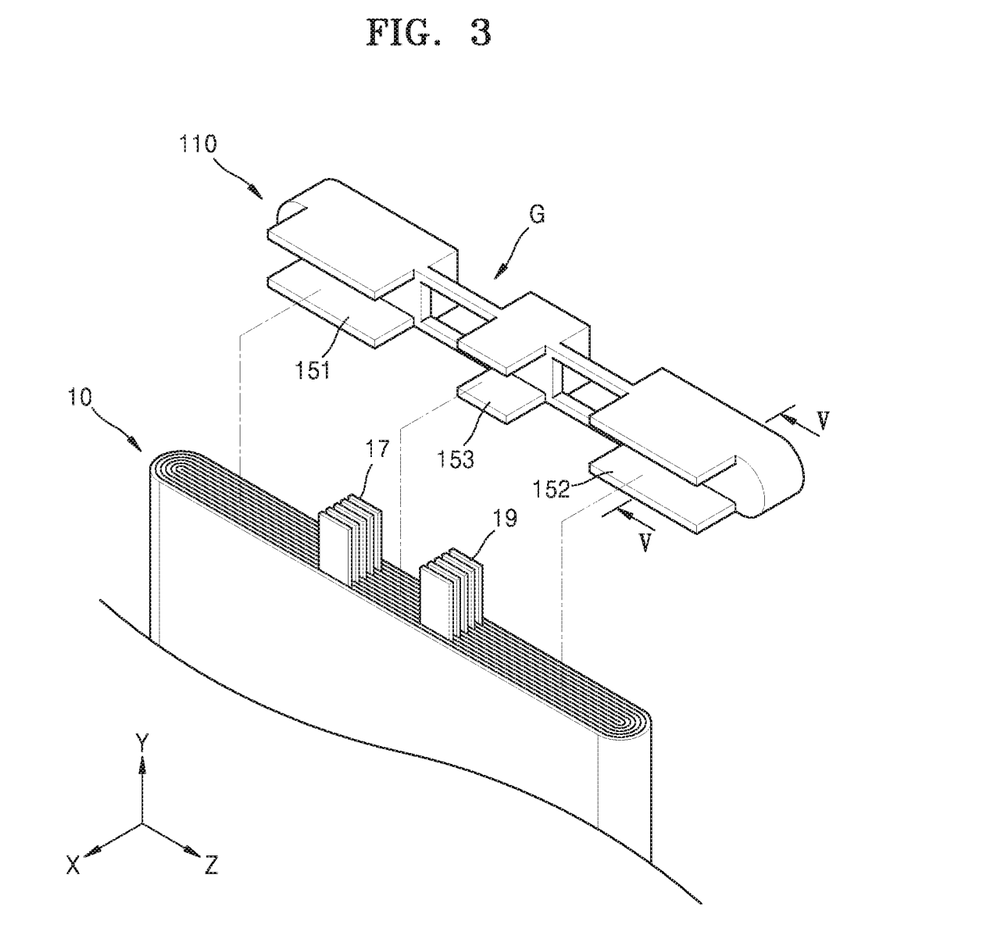
FIGS. 3 and 4 are views illustrating a method of assembling an insulation spacer and an electrode assembly that are illustrated in FIG. 2.
Figure 4:
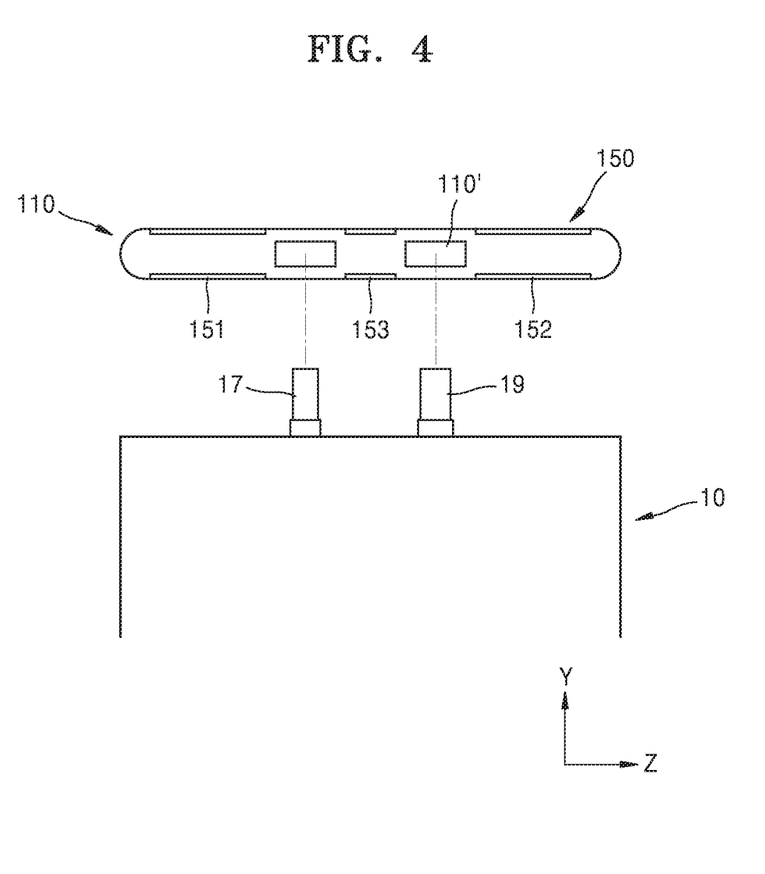
Figure 5A:
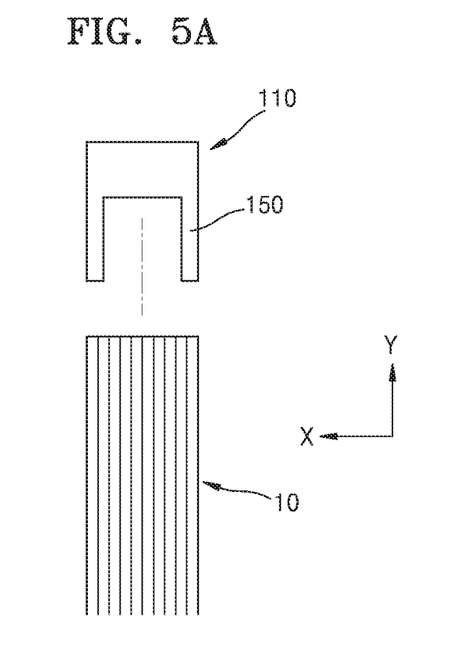
FIGS. 5A and 5B are cross-sectional views taken along line V-V of FIG. 3 for illustrating an assembled state of wings and the electrode assembly.
Figure 5B:
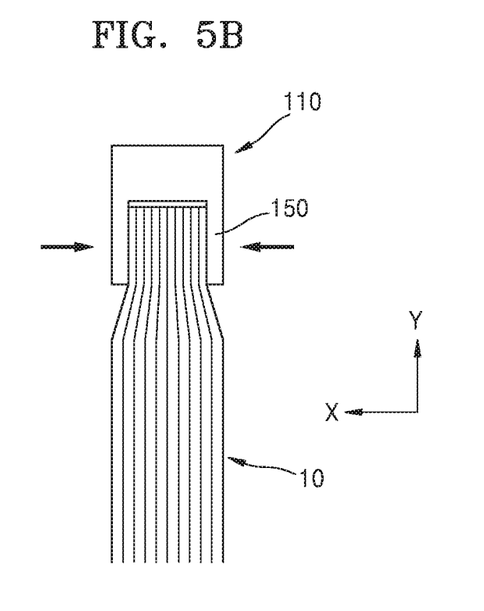

FIG. 1 is an exploded perspective view illustrating a secondary battery according to an exemplary embodiment. FIG. 2 is an exploded perspective view illustrating some elements of the secondary battery illustrated in FIG. 1. FIGS. 3 and 4 are views illustrating a method of assembling an insulation spacer 110 and an electrode assembly 10 that are illustrated in FIG. 2. FIGS. 5A and 5B are cross-sectional views taken along line V-V of FIG. 3 for illustrating an assembled state of wings 150 and the electrode assembly 10.

Referring to FIGS. 1 to 5B, the secondary battery includes the electrode assembly 10, the insulation spacer 110 disposed on the electrode assembly 10, a case 20 accommodating the electrode assembly 10 and the insulation spacer 110, and a cap plate 130 closing an upper side of the case 20.

The electrode assembly 10 may be a rechargeable electrode assembly such as a lithium-ion battery electrode assembly. The electrode assembly 10 may include a first electrode plate 11, a second electrode plate 13, and a separator 15. The electrode assembly 10 may be accommodated in the case 20 together with an electrolyte, and then the case 20 may be sealed.

For example, the electrode assembly 10 may be formed by winding a stack of the first electrode plate 11, the second electrode plate 13, and the separator 15 in the shape of a jelly roll. The first electrode plate 11 may be a positive electrode plate formed by applying a positive electrode active material to at least one side of a positive electrode collector (not shown). Similarly, the second electrode plate 13 may be a negative electrode plate formed by applying a negative electrode active material to at least one side of a negative electrode collector (not shown). In the exemplary embodiment, for example, the first electrode plate 11 may be disposed on the outermost side of the electrode assembly 10. In this case, since the positive electrode collector (not shown) generating a relatively large amount of heat is placed on the outermost side close to the case 20, the dissipation of heat through the case 20 may be facilitated. For example, the positive electrode collector (not shown) may be directly in contact with the case 20 or may at least make thermal contact with the case 20. The expression "thermal contact" is used to denote a relationship between two parts that allows for heat transfer between the two parts even though the two parts are not directly in contact with each other.

The electrode assembly 10 and an electrolyte (not shown) may be inserted into the case 20 through an opened upper end of the case 20, and then the upper end of the case 20 may be sealed with the cap plate 130. Contact portions of the cap plate 130 and the can 20 may be hermetically joined by a laser welding method.

First electrode tabs 17 and second electrode tabs 19 may be connected to at least portions of the first electrode plate 11 and the second electrode plate 13. In the present disclosure, the first electrode tabs 17 and the second electrode tabs 19 may be collectively referred to as electrode tabs 17 and 19. If the secondary battery is a high-capacity, high-power secondary battery, a plurality of first electrode tabs 17 and a plurality of second electrode tabs 19 may extend from the electrode assembly 10. In this case, although a large amount of current is output through the first electrode tabs 17 and the second electrode tabs 19, loss caused by electric resistance may be low. However, the inventive concept is not limited to the case of using a plurality of first electrode tabs 17 and a plurality of second electrode tabs 19. That is, for example, the inventive concept may be applied substantially in the same manner to the case in which a first electrode tab 17 and a second electrode tab 19 extend from the electrode assembly 10.

The first electrode tabs 17 may be connected to the cap plate 130, and the second electrode tabs 19 may be connected to a second electrode terminal 139 exposed on an upper surface of the cap plate 130. For example, a first electrode terminal 137 and the second electrode terminal 139 may be exposed on the upper surface of the cap plate 130. The first electrode terminal 137 may be a protruding part formed in one piece with the cap plate 130 or may be a separate member coupled to the cap plate 130. The first electrode terminal 137 and the cap plate 130 may have a positive polarity. In an assembled state, the second electrode terminal 139 may penetrate the cap plate 130. The second electrode terminal 139 may be coupled to the cap plate 130 in a state in which the second electrode terminal 139 is insulated from the cap plate 130 and exposed on the upper surface of the cap plate 130.

The second electrode terminal 139 may be a separate member coupled to the cap plate 130 and penetrating the cap plate 130. The second electrode terminal 139 may be coupled to the cap plate 130 in a state in which the second electrode terminal 139 is insulated from the cap plate 130 and protrudes from the upper surface of the cap plate 130. In the present disclosure, one or both of the first electrode terminal 137 and the second electrode terminal 139 may be collectively referred to as an electrode terminal or electrode terminals 137 and 139.

The first and second electrode tabs 17 and 19 may be inserted into tab holes 110' of the insulation spacer 110 in a combined state in such a manner that the first and second electrode tabs 17 and 19 may extend upward through the tab holes 110' of the insulation spacer 110. Thereafter, upper ends of the first electrode tabs 17 inserted into the insulation spacer 110 may be connected to a first electrode lead 127, and upper ends of the second electrode tabs 19 inserted into the insulation spacer 110 may be connected to a second electrode lead 129.

Before the first electrode tabs 17 are inserted into the insulation spacer 110, the first electrode tabs 17 may be pre-welded to each other as a single bundle. As described above, if the first electrode tabs 17 are pre-welded to each other as a single bundle, the first electrode tabs 17 may be more easily inserted into the tab hole 110' of the insulation spacer 110. Similarly, before the second electrode tabs 19 are inserted into the insulation spacer 110, the second electrode tabs 19 may be pre-welded to each other as a single bundle.

The first electrode tabs 17 are inserted through the tab hole 110' of the insulation spacer 110 and exposed on an upper surface of the insulation spacer 110, and the exposed upper ends of the first electrode tabs 17 are connected to the first electrode lead 127. The first electrode lead 127 is connected to the cap plate 130. In the manner, the first electrode tabs 17 of the electrode assembly 10 are electrically connected to the cap plate 130 through the first electrode lead 127. The cap plate 130 may have a positive polarity like the first electrode tabs 17, and a portion of the cap plate 130 may protrude as the first electrode terminal 137. In the present disclosure, one or both of the first electrode lead 127 and the second electrode lead 129 may be collectively referred to as an electrode lead or electrode leads 127 and 129.

The first electrode lead 127 may be coupled to the cap plate 130 using a coupling pin 131 protruding from the cap plate 130. For example, the coupling pin 131 protruding from a lower surface of the cap plate 130 may be inserted through the first electrode lead 127, and a lower end of the coupling pin 131 exposed on a lower surface of the first electrode lead 127 may be coupled to the lower surface of the first electrode lead 127 by riveting or spinning.

The second electrode terminal 139 may be coupled to the cap plate 130 with a gasket 135 being disposed therebetween. A terminal hole 130' may be formed in the cap plate 130 such that the second electrode terminal 139 may be inserted through the terminal hole 130'. The second electrode terminal 139 may be inserted into the terminal hole 130' of the cap plate 130 with the gasket 135 being disposed between the second electrode terminal 139 and the cap plate 130. The gasket 135 may seal the terminal hole 130' to prevent leakage of the electrolyte contained in the case 20 and introduction of contaminants into the case 120.

An insulation plate 125 may be disposed between the second electrode lead 129 and the cap plate 130 to electrically insulate the second electrode lead 129 and the cap plate 130 from each other. The insulation plate 125 and the gasket 135 electrically insulate the cap plate 130 such that the cap plate 130 electrically connected to the first electrode tab 17 of the electrode assembly 10 may not be connected to an opposite polarity. Terminal holes 125' and 129' may be respectively formed in the insulation plate 125 and the second electrode lead 129 such that the second electrode terminal 139 may be inserted through the terminal holes 125' and 129'

The second electrode terminal 139 is inserted through the terminal holes 130', 125', and 129' of the cap plate 130, the insulation plate 125, and the second electrode lead 129, and a lower portion of the second electrode terminal 139 is pressed against a lower surface of the second electrode lead 129. Therefore, the cap plate 130, the insulation plate 125, and the second electrode lead 129 may be integrally combined with each other.

The insulation spacer 110 may be disposed between the electrode assembly 10 and the cap plate 130. The insulation spacer 110 includes an insulative material to prevent electrical interference or a short circuit between the electrode assembly 10 and the cap plate 130. For example, the insulation spacer 110 may be disposed between the electrode assembly 10 and the electrode leads 127 and 129. In addition, the insulation spacer 110 combines the electrode tabs 17 and 19 extending from the electrode assembly 10, and thus the electrode tabs 17 and 19 may easily be electrically connected to the electrode leads 127 and 129.

For example, the first electrode tabs 17 and the second electrode tabs 19 extending upward from the electrode assembly 10 may be combined as bundles when the first electrode tabs 17 and the second electrode tabs 19 are inserted into the tab holes 110' of the insulation spacer 110, and then the bundles of the first electrode tabs 17 and the second electrode tabs 19 may be respectively electrically connected to the first electrode lead 127 and the second electrode lead 129 by a method such as a welding method.

In addition, the insulation spacer 110 forms a proper space between the electrode assembly 10 and the cap plate 130 such that the electrode tabs 17 and 19 may be securely insulated from each other even in a situation such as the secondary battery being dropped and impacted.

Welding recesses G are formed in the insulation spacer 110 so as to allow the electrode tabs 17 and 19 to be welded to the electrode leads 127 and 129. For example, the welding recesses G may be formed at assembling positions of the electrode tabs 17 and 19. For example, the welding recesses G may be formed in alignment with the tab holes 110'. Owing to the welding recesses G, the first and second electrode tabs 17 and 19 inserted through the tab holes 110' may be exposed to the outside of the insulation spacer 110 and may be welded to the first and second electrode leads 127 and 129. For example, the first and second electrode tabs 17 and 19 may be welded to the first and second electrode leads 127 and 129 by an ultrasonic welding method.

According to the exemplary embodiment, the insulation spacer 110 includes wings 150 or compression members protruding toward the electrode assembly 10 and configured to firmly fix the electrode assembly 10. The wings 150 may protrude downward from the insulation spacer 110 toward the electrode assembly 10 and may firmly fix the electrode assembly 10 by holding the electrode assembly 10 in compressing directions. For example, the wings 150 may press main surfaces of the electrode assembly 10. Herein, the main surfaces of the electrode assembly 10 may refer to the largest surfaces of the electrode assembly 10 having a rectangular parallelepiped shape. For example, the wings 150 may push opposite main surfaces (front and rear surfaces) of the electrode assembly 10, so as to firmly fix the electrode assembly 10.

The expression "the wings 150 firmly fix the electrode assembly 10" may mean, without limitation, that the wings 150 maintain the shape of the electrode assembly 10. For example, as the electrode assembly 10 is repeatedly charged and discharged, the electrode assembly 10 may emit heat, and thus a part of the electrode assembly 10 vulnerable to heat such as the separator 15 may be shrunk by heat. In this case, the first and second electrode plates 11 and 13 having different polarities may be directly in contact with each other, and thus an internal short circuit may be formed.

In this case, however, if the wings 150 protruding from the insulation spacer 110 toward the electrode assembly 10 press the electrode assembly 10 in compressing directions, the separator 15 disposed between the first and second electrode plates 11 and 13 may be clamped by the wings 150 and thus may be less likely to be shrunk by heat. As described above, since the wings 150 press the electrode assembly 10 in compressing directions, the thermal shrinkage or expansion of the electrode assembly 10 may be suppressed, and thus the shape of the electrode assembly 10 may be maintained.

The wings 150 may provided as pairs at positions facing each other. For example, the pairs of the wings 150 may be arranged at positions facing the opposite main surfaces (front and rear surfaces) of the electrode assembly 10 and may press the front and rear surfaces of the electrode assembly 10.

For example, the wings 150 may protrude from a plurality of positions of the insulation spacer 110. The wings 150 may be formed in regions around the electrode tabs 17 and 19 of the electrode assembly 10. For example, the wings 150 may include first wings 151 disposed at an outer side of the first electrode tabs 17, second wings 152 disposed at an outer side of the second electrode tabs 19, and third wings 153 disposed between the first electrode tabs 17 and the second electrode tabs 19.

For example, the first to third wings 151 to 153 may be respectively provided as pairs at positions facing the front and rear surfaces of the electrode assembly 10. The first wings 151 may press a portion of the electrode assembly 10 located at the outer side of the first electrode tabs 17, the second wings 152 may press a portion of the electrode assembly 10 located at the outer side of the second electrode tabs 19, and the third wings 153 may press a portion of the electrode assembly 10 located between the first electrode tabs 17 and the second electrode tabs 19.

In another example, the wings 150 may include at least one of the pairs of the first wings 151 disposed at the outer side of the first electrode tabs 17, the second wings 152 disposed at the outer side of the second electrode tabs 19, and the third wings 153 disposed between the first electrode tabs 17 and the second electrode tabs 19. That is, in another exemplary embodiment, the wings 150 may only include the first wings 151, the second wings 152, or the third wings 153.

As described above, if the wings 150 are formed at different positions relative to the electrode assembly 10, the wings 150 may fix the electrode assembly 10 by holding different portions of the electrode assembly 10, and thus the electrode assembly 10 may be more effectively fixed.

The wings 150 may be formed around the electrode tabs 17 and 19 of the electrode assembly 10. The reason for this is that the possibility of deformation of the electrode assembly 10 such as thermal shrinkage of the separator 15 is high at regions around the electrode tabs 17 and 19 because resistive heat may be mainly generated in the regions.

In the exemplary embodiment, the wings 150 may protrude from the insulation spacer 110. However, the positions at which the wings 150 are disposed are not limited to the insulation spacer 110. For example, the wings 150 may be disposed on an upper end portion of the electrode assembly 10 regardless of the insulation spacer 110. The wings 150 may press the electrode assembly 10 in compressing directions, so as to firmly fix the electrode assembly 10. For example, the wings 150 may fix the upper end portion of the electrode assembly 10. As described later, according to another exemplary embodiment, the wings 150 may fix a lower end portion of the electrode assembly 10. That is, the wings 150 may press the upper or lower end portion of the electrode assembly 10 in compressing directions.

Figure 6A:
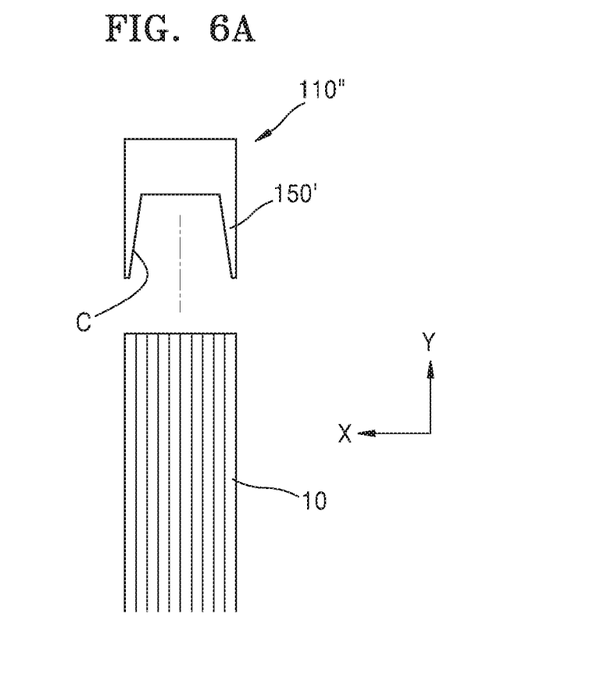
FIGS. 6A and 6B are cross-sectional views illustrating an assembled state of wings and an electrode assembly of a secondary battery according to another exemplary embodiment.
Figure 6B:
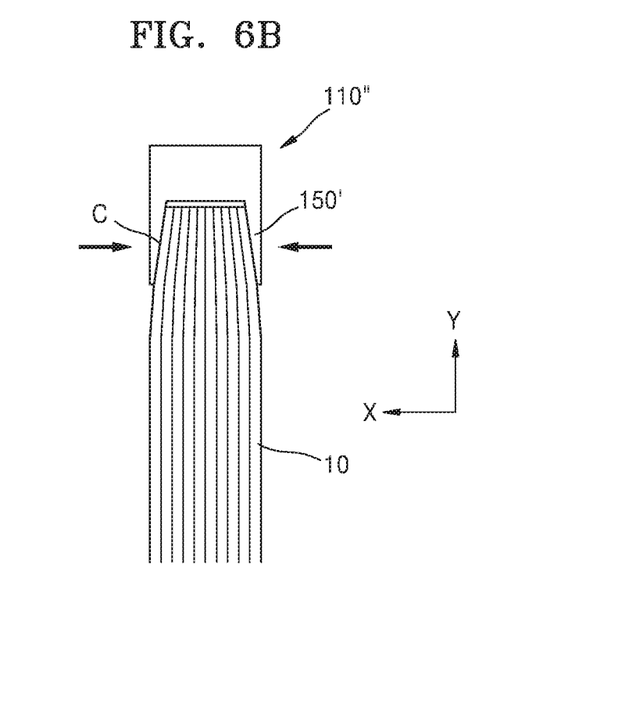

FIGS. 6A and 6B are cross-sectional views illustrating an assembled state of wings 150' and an electrode assembly 10 of a secondary battery according to another exemplary embodiment.

Referring to FIGS. 6A and 6B, when an insulation spacer 110" is coupled to the electrode assembly 10, the wings 150' protruding downward from the insulation spacer 110" may be moved toward the electrode assembly 10 and brought into tight contact with an outer surface of the electrode assembly 10. For this, surfaces C of the wings 150' facing or surrounding the electrode assembly 10 may be sloped so as to reduce resistance when the wings 150' engage with the electrode assembly 10. The sloped surfaces C have slopes in directions allowing the wings 150' to easily slide inward on the outer surface of the electrode assembly 10. That is, since the sloped surfaces C reduce the engagement resistance of the wings 150', the insulation spacer 110" including the wings 150' may be smoothly assembled, and the wings 150' may be moved to a proper assembling position of the electrode assembly 10. For example, if the wings 150' are inserted into the electrode assembly 10 instead of engaging with the outer surface of the electrode assembly 10, the output power of the electrode assembly 10 may be negatively affected.

Figure 7:
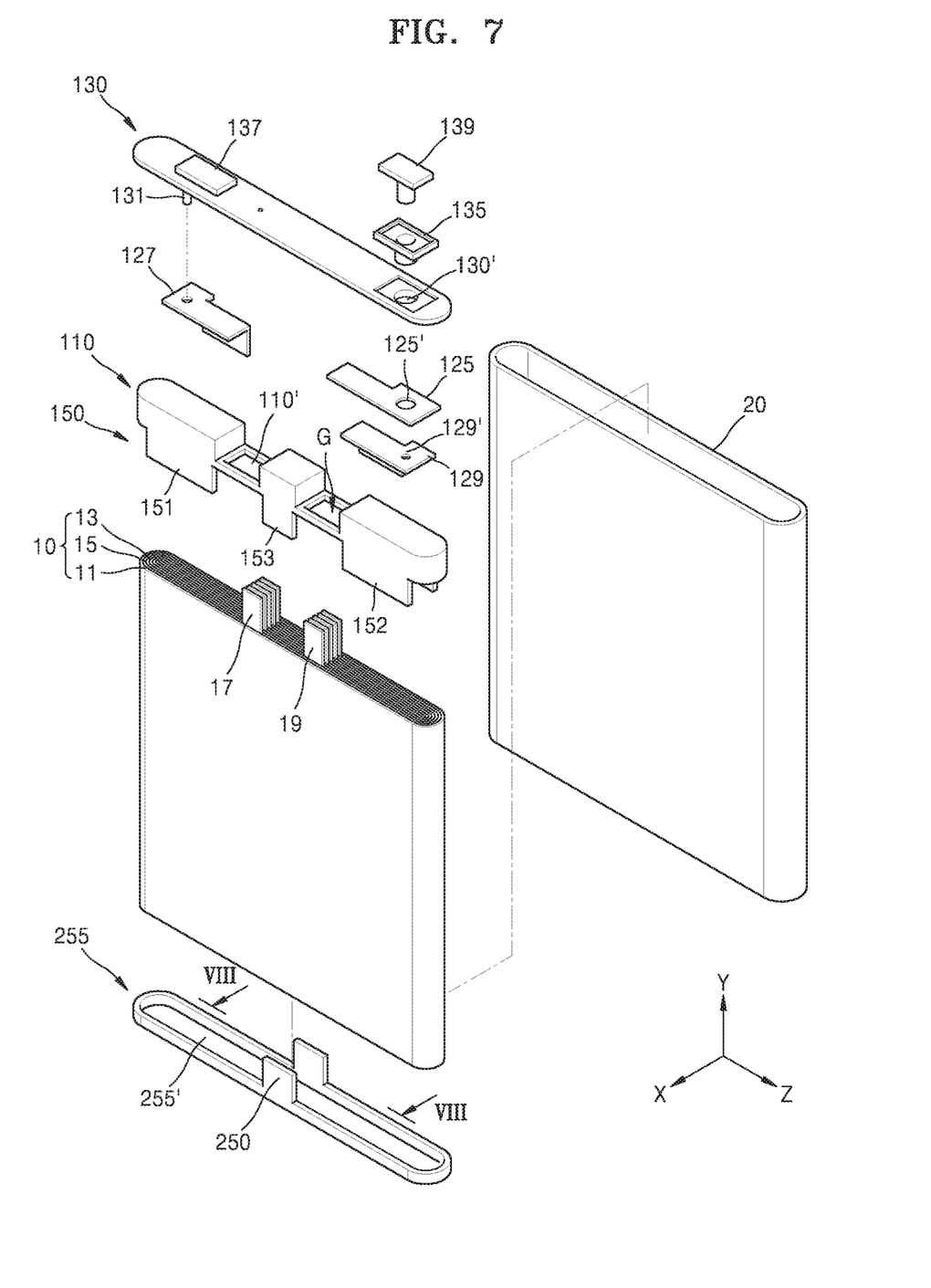
FIG. 7 is an exploded perspective view illustrating a secondary battery according to another exemplary embodiment.
Figure 8:
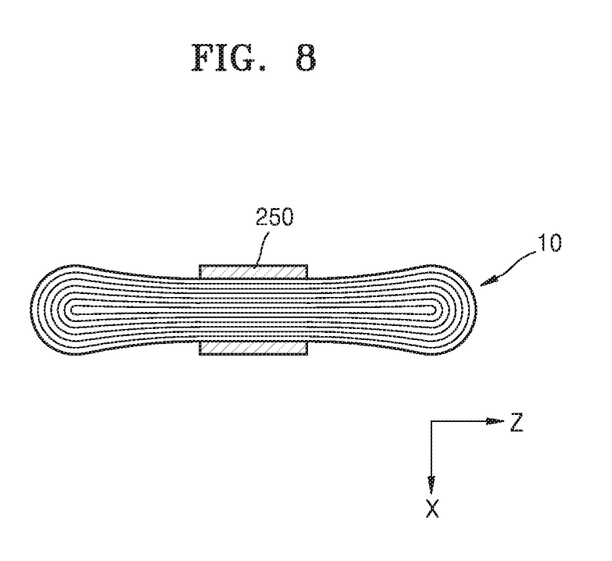
FIG. 8 is a cross-sectional view taken along line VIII-VIII of FIG. 7 for illustrating an assembled state of wings and an electrode assembly.

FIG. 7 is an exploded perspective view illustrating a secondary battery according to another exemplary embodiment. FIG. 8 is a cross-sectional view taken along line VIII-VIII of FIG. 7 for illustrating an assembled state of wings 250 and an electrode assembly 10.

Referring to FIGS. 7 and 8, the wings 250 are disposed under the electrode assembly 10. The wings 250 may fix a lower end portion of the electrode assembly 10. The wings 250 may be disposed on a support member 255 having a central penetration hole 255'. The penetration hole 255' is formed to allow for flow of an electrolyte into the electrode assembly 10. The wings 250 may face main surfaces of the electrode assembly 10 at the lower end portion of the electrode assembly 10. That is, the wings 250 may face the main surfaces (front and rear surfaces) of the electrode assembly 10 and may press the front and rear surfaces of the electrode assembly 10 in compressing directions.

For example, the wings 250 may be disposed on the support member 255. The support member 255 may be disposed under the electrode assembly 10, and the wings 250 may be provided as a pair on the support member 255 at positions facing the front and rear surfaces of the electrode assembly 10. For example, the wings 250 may protrude upward from the support member 255 toward the electrode assembly 10. In addition, first to third wings 151, 152, and 153 may be disposed on an insulation spacer 110 disposed above the electrode assembly 10.

Figure 9:
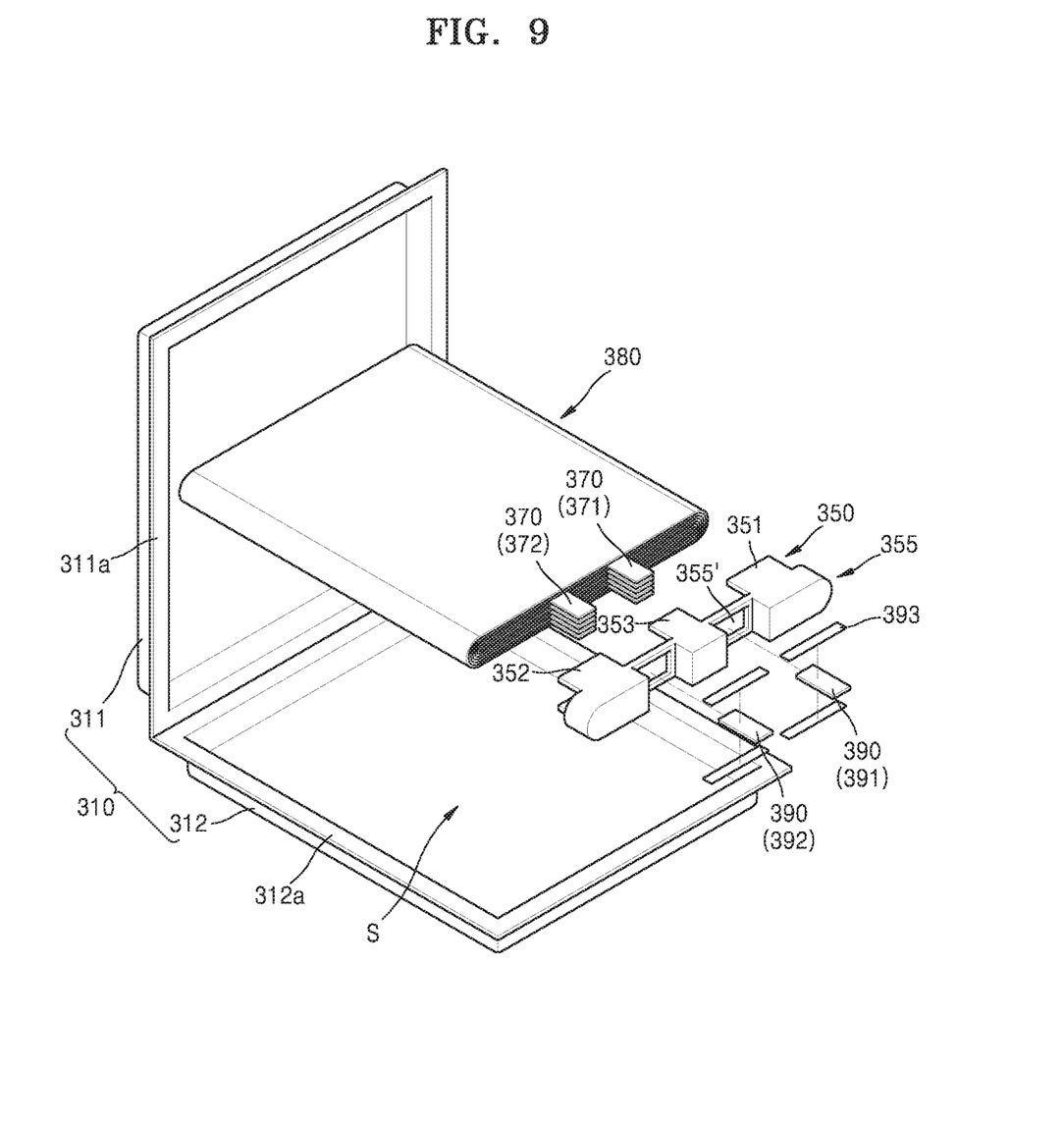
FIG. 9 is an exploded perspective view illustrating a secondary battery according to another exemplary embodiment.

FIG. 9 is an exploded perspective view illustrating a secondary battery according to another exemplary embodiment.

Referring to FIG. 9, the secondary battery may include an electrode assembly 380 and a case 310 providing an accommodation space S for the electrode assembly 380. For example, the case 310 may include first and second cases 311 and 312 facing each other, and the first and second cases 311 and 312 may include sealing surfaces 311a and 312a.

Electrode tabs 370 extending from the electrode assembly 380 may be connected to electrode leads 390 (first and second electrode leads 391 and 392) through tab holes 355' of an insulation spacer 355. For example, the electrode tabs 370 may include first electrode tabs 371 and second electrode tabs 372 that have different polarities and are respectively coupled to the first and second electrode leads 391 and 392. Sealing members 393 may be disposed on the first and second electrode leads 391 and 392. The sealing members 393 may easily be fused to the case 310 and may insulate the first and second electrode leads 391 and 392 from the case 310.

In the current exemplary embodiment, the secondary battery may include wings 350 configured to press one of front and rear end portions of the electrode assembly 380. For example, the wings 350 may protrude from the insulation spacer 355 toward the electrode assembly 380. For example, the wings 350 may protrude from a plurality of positions of the insulation spacer 355.

The wings 350 may be formed in regions around the electrode tabs 370 of the electrode assembly 380. For example, the wings 350 may include first wings 351 disposed at an outer side of the first electrode tabs 371, second wings 352 disposed at an outer side of the second electrode tabs 372, and third wings 353 disposed between the first electrode tabs 371 and the second electrode tabs 372.

For example, the first to third wings 351 to 352 may be respectively provided as pairs at positions facing front and rear surfaces of the electrode assembly 380 (that is, upper and lower surfaces of the electrode assembly 380 in FIG. 9). The first wings 151 may press a portion of the electrode assembly 380 located at the outer side of the first electrode tabs 371, the second wings 353 may press a portion of the electrode assembly 380 located at the outer side of the second electrode tabs 372, and the third wings 153 may press a portion of the electrode assembly 380 located between the first wings 351 disposed outside first electrode tabs 371 and the second electrode tabs 372.

As described above, according to the one or more of the above exemplary embodiments, the shape of the electrode assembly may be maintained owing to the wings firmly fixing the electrode assembly. For example, as the electrode assembly is repeatedly charged and discharged, the electrode assembly may generate heat, and thus a portion of the electrode assembly vulnerable to heat such as the separator of the electrode assembly may be shrunk by heat. In this case, the electrode plates of the electrode assembly having different polarities may be directly in contact with each other, and an internal short circuit may be formed between the electrode plates. However, this may be prevented owing to the wings.

According to the one or more of the above exemplary embodiments, since the wings press the electrode assembly in compressing directions, thermal shrinkage or expansion of the electrode assembly may be suppressed, and thus the shape of the electrode assembly may be maintained.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A secondary battery comprising:
an electrode assembly comprising a first electrode plate, a second electrode plate and a separator interposed between the first and second electrode plates; and
wings configured to press one of upper and lower ends of the electrode assembly in compressing directions, wherein the wings directly contact the electrode assembly, and
wherein the wings are provided as a pair configured to clamp the separator so as to suppress thermal shrinkage or thermal expansion of the electrode assembly.

2. The secondary battery of claim 1, wherein the wings press main surfaces of the electrode assembly.

3. The secondary battery of claim 2, wherein the pair of wings are located at positions facing front and rear surfaces of the electrode assembly so as to press the front and rear surfaces of the electrode assembly.

4. The secondary battery of claim 3, wherein one of the upper and lower ends of the electrode assembly is disposed between the wings provided as a pair and is pressed by the wings.

5. The secondary battery of claim 1, further comprising an insulation spacer disposed above the electrode assembly, wherein the wings protrude from the insulation spacer toward the electrode assembly.

6. The secondary battery of claim 5, wherein the insulation spacer comprises tab holes to receive electrode tabs extending upward from the electrode assembly.

7. The secondary battery of claim 6, wherein the electrode tabs are electrically connected to electrode leads forming a charge or discharge current path.

8. The secondary battery of claim 6, wherein the electrode tabs comprise first tabs and second tabs, the first and second tabs having different polarities and extending from the electrode assembly in parallel with each other, and
the wings comprise first wings disposed at an outer side of the first electrode tabs and second wings disposed at an outer side of the second electrode tabs.

9. The secondary battery of claim 8, wherein the wings further comprise third wings disposed between the first and second electrode tabs.

10. The secondary battery of claim 9, wherein the first to third wings are respectively provided as pairs at positions facing front and rear surfaces of the electrode assembly,
the first wings press a portion of the electrode assembly located at the outer side of the first electrode tabs,
the second wings press a portion of the electrode assembly located at the outer side of the second electrode tabs, and
the third wings press a portion of the electrode assembly located between the first and second electrode tabs.

11. The secondary battery of claim 1, further comprising a support member disposed under the electrode assembly, wherein the wings protrude from the support member toward the electrode assembly.

12. The secondary battery of claim 11, wherein a penetration hole is formed in a center region of the support member.

13. The secondary battery of claim 1, wherein the wings comprise sloped surfaces facing the electrode assembly.

14. The secondary battery of claim 13, wherein the sloped surfaces have slopes in directions allowing the wings to slide inward on an outer surface of the electrode assembly.

15. The secondary battery of claim 1, further comprising:
a case accommodating the electrode assembly; and
a cap plate closing an opened end of the case.

16. The secondary battery of claim 1, further comprising a flexible case accommodating the electrode assembly.

* * * * *